Oct. 30, 1934.  C. C. HARRAH  1,978,529
FLEXIBLE CONDUIT
Filed Sept. 28, 1933    2 Sheets-Sheet 1

INVENTOR.
Clayton C. Harrah
BY
Jn. W. M'Conkey
ATTORNEY.

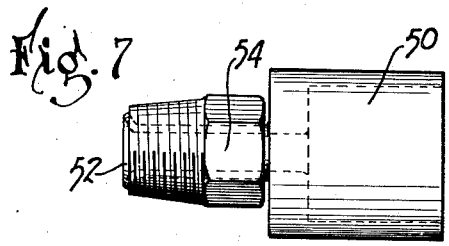
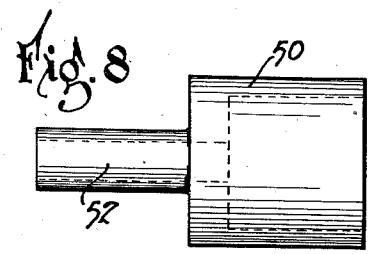
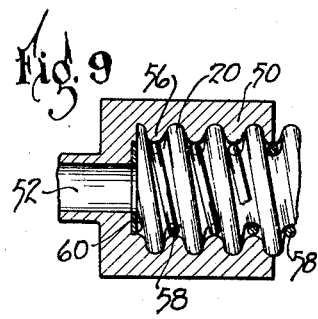
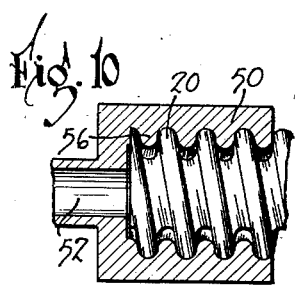
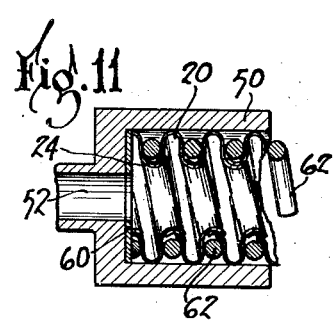
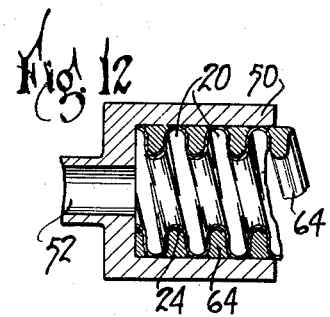
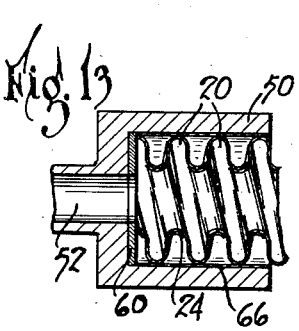
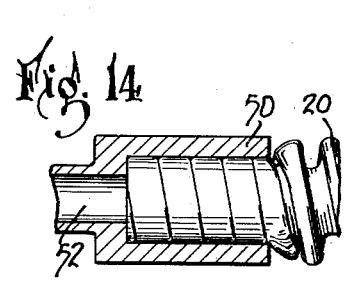
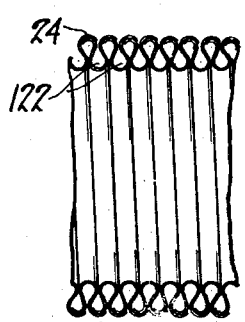
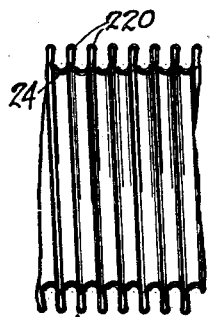
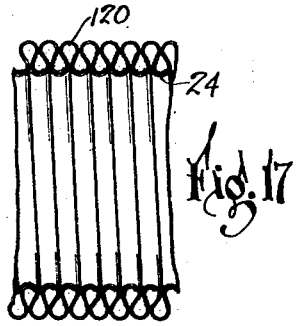

Patented Oct. 30, 1934

1,978,529

UNITED STATES PATENT OFFICE 1,978,529

FLEXIBLE CONDUIT

Clayton C. Harrah, Niles, Mich., assignor to National Standard Company, Niles, Mich., a corporation of Michigan Application September 28, 1933, Serial No. 691,344

2 Claims. (Cl. 137—75)

This invention relates to conduits, and is illustrated as embodied in a flexible spirally-corrugated conduit of the type comprising a spirally-arranged corrugated strip having the margins of adjacent convolutions permanently secured together.

Prior conduits of this type have generally been formed with a lock seam of some kind, or with a welded or soldered or other joint forming virtually a line joint at the extreme edge of the margin of the convolutions. It is extremely difficult, and prohibitively expensive, to make such joints strong enough and tight enough for some of the purposes for which conduits of this type are otherwise well adapted.

Efforts have been made to utilize similar conduits formed of seamless tubing for these purposes, but the seamless tubing is an expensive material to use for making the conduits, and moreover the conduits formed in this manner are weakened in that the drawing of the metal in forming the corrugations gives a relatively thin section in the bottoms of the corrugations, where strength is most needed, and a thicker section in the walls of the corrugations, where the greatest flexibility is desired.

An important object of the present invention is to secure the advantages of both of these prior types of conduits, without the disadvantages of either, by forming a conduit of a spirally-arranged corrugated strip of steel or other metal, with the margins of the adjacent convolutions overlapping and permanently secured together in a novel joint of great strength which does not tend to separate even at high pressures.

Preferably this joint is formed by permanently uniting the surfaces of the margins of the adjacent convolutions by a metallic surface bond throughout the entire overlapping area. In the illustrated arrangement, this bond is of copper, or it may be of brass or silver alloy or other bonding metal, heated in a reducing atmosphere so that it extends into the body of the steel or other metal of the overlapping margins to form virtually an integral double-thickness structure which is actually stronger than the metal between the joints.

This manner of overlapping and permanently uniting the margins gives the greatest wall thickness where the greatest strength is needed, and leaves the sides of the corrugations relatively thin to give the maximum flexibility. At the same time the relatively great area of the joint, and the fact that the metal of the joint extends a substantial distance into the body of the steel on both sides, gives an extremely strong joint, and one which does not tend to separate in hard usage as would for example be the case with a welded or other line joint.

If desired, additional carbon may be introduced into the steel adjacent its opposite surfaces, preferably during the formation of the above-described joint, to give a hardened skin to the steel. I also prefer to anneal the steel at the same time that the joint is formed, so that the formation of the joint does not adversely affect the structure and stresses of the steel as might be the case if it were formed in a separate operation, and so that the penetration of the bonding metal occurs during the annealing.

Another feature relates to the mounting of a separate end fitting on a conduit of this sort, in such a manner as to form a tight and very strong joint with the conduit. Preferably the fitting is attached to the conduit by a metallic bond, for example by a permanent bond of copper or other bonding metal which extends into the metal of the fitting and of the conduit.

By forming this bond at the same time that I form the above-described joint in the conduit, they become one continuous bond permanently uniting the overlapping edges of the convolutions of the conduit and permanently uniting the fitting and the corrugations at the end of the conduit, thereby insuring that there will be no gaps or weak places which might leak.

It is possible, and sometimes desirable, in making up my novel conduit to form it on a taper by progressively increasing or decreasing the radius as the above-described strip is being wound; also by similar changes during the winding operation a conduit may be formed having integrally connected sections of different diameters.

The above and other objects and features of the invention, including various novel combinations of parts and desirable particular constructions, will be apparent from the following description of the illustrative embodiments shown in the accompanying drawings, in which:

Figure 7 is a side elevation of a fitting which may be used;

Figure 8 is a side elevation of the element of the fitting which is attached to the conduit;

Figures 9–14 are sections showing various attachments of the fittings to the conduit; and Figures 15, 16, and 17 are sections through three modifications of finished conduits.

The illustrated conduits are intended to be formed by spirally winding a corrugated strip, for example of steel plated or otherwise coated with copper (or with brass or silver alloy or other bonding metal), preferably in the machine covered by application No. 695,270, filed October 26, 1933, then attaching the overlapping margins of adjacent convolutions by a novel very strong joint as described below, and if desired attaching end fittings in a novel and advantageous manner also described below.

As explained in said application, if desired the radius of the conduit may be increased or decreased during the winding operation, to form the conduit on a taper, or to form a conduit having sections of different diameters.

The present application relates to the flexible conduit so constructed, as an article of manufacture, the method of making it being more fully explained and being claimed in my copending application No. 691,345, filed September 28, 1933.

Figure 1:
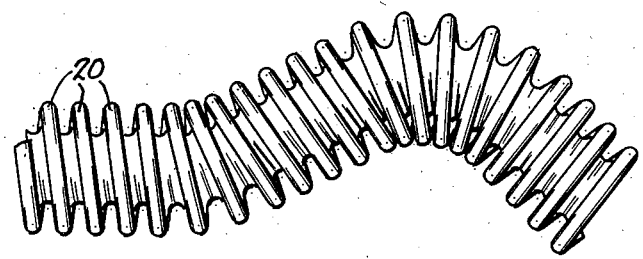
Figure 1 is a side elevation of a section of my novel flexible conduit, after brazing the joints and before it is compressed endwise.
Figure 2:
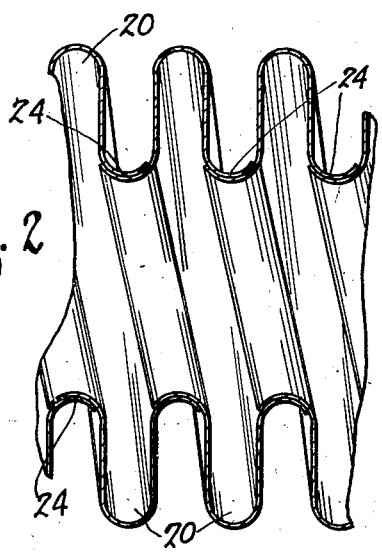
Figure 2 is a section longitudinally through a section of such conduit having the brazed joint at the bottom of the inwardly-extending corrugations.
Figure 3:
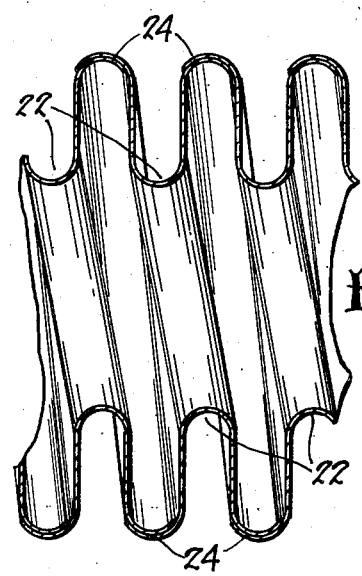
Figure 3 is a similar section showing a conduit having the brazed joint at the top of the outwardly-extending corrugations.

The conduit is formed of a strip of material such as copper-plated steel, or steel coated with brass or silver alloy or other bonding material, rolled or otherwise formed to provide a central outwardly-extending corrugation 20 (Figures 1 and 2), or a central inwardly-extending corrugation 22, with the margins 24 overlapping for a substantial distance to form a double-thickness joint extending spirally for the length of the conduit.

If preferred, the strip may be rolled to form an inwardly-extending corrugation 26 and an outwardly-extending corrugation 28 on the same strip, the margins overlapping for a substantial distance and preferably interlocked to form a seam 30 in the side wall of the corrugations.

Figure 5:
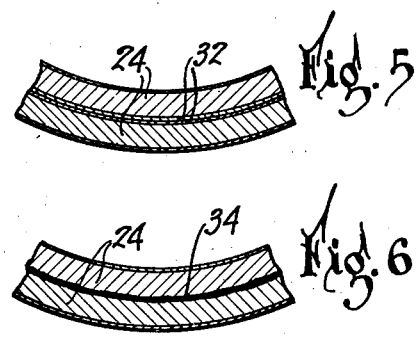
Figure 5 is a section on an enlarged scale through the joint of Figure 2, before brazing.

In all these forms, the strip is rolled spirally under considerable tension to overlap the margins as shown, providing a joint such as shown in Figure 5, with the layers 32 of metal plate held by the tension of the steel strip in intimate contact. This provides a tight joint which is in many cases, where there are no high pressures in the conduit, sufficient for the purpose, the relatively soft metal layers 32 being compressed together and forming a seal.

However, as more fully explained in the above-mentioned copending application, for forming the conduit to withstand high internal pressures it is essential to join the overlapping margins by a strong joint which is without gaps or interruptions, and which is not weakened by the repeated flexing of the conduit. Such a joint is advantageously a complete metallic bond throughout the area of the overlapping margins 24.

As set forth more fully in my said method application, I preferably accomplish this by passing the conduit, with the joint in the condition of Figure 5, through a hydrogen furnace or the like, in which it is highly heated in a reducing or at least a non-oxidizing atmosphere, and then slowly cooling it while still in the non-oxidizing atmosphere.

Figure 6:
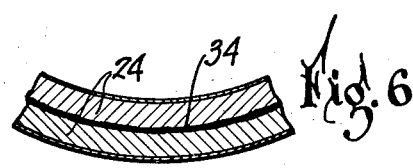
Figure 6 is a similar section, after brazing.

This forms a joint 34 as shown in Figure 6, generally like a brazed joint. The bonding metal runs into the structure of the steel of the margins 24, throughout their entire overlapping area, giving a very strong bond which includes the steel of the entire overlapping area of the margins, and which I find in practice to be substantially as strong as the steel itself. Where great strength is the principal object, I prefer copper as the bonding metal, but for many purposes brass or silver alloy or the like forms a joint which is satisfactorily, as the large area of the joint is a major factor in insuring great strength. At the same time that this joint is formed, and as a part of the same step, the steel is annealed thereby relieving the tension under which the strip was wound, and also relieving the steel of all other internal stresses and strains.

The result is an annealed steel flexible corrugated conduit, free of internal stresses and strains, and with adjacent convolutions permanently united by a bond of metal such as copper, which enters into the structure of the steel (as it is opened up by the heat) to make the overlapping margins in effect integrally united throughout the entire area of the overlapping portions.

Not only is such a joint very strong, but since it occupies a considerable area it is not weakened by repeated flexing of the conduit, as would be the case for example with an arc weld or other weld or joint forming practically a line joint.

Figure 4:
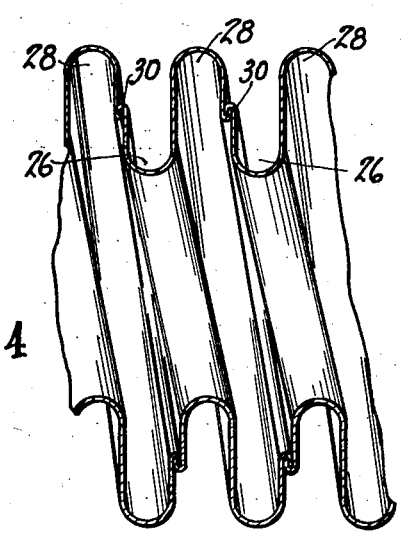
Figure 4 is a similar section showing a conduit having the brazed joint in the side wall of the corrugations.

The joint 30 of Figure 4 may be similarly treated to make it in effect an integral mass of steel bonded by metal extending intimately into its structure.

As explained in the copending method application, if desired methane or carbon monoxide (e. g. exhaust gas from an engine or burner) or other carbon compound can be introduced into the hydrogen furnace, and will cause the introduction of excess carbon into the surface portions of the steel during the annealing operation, giving some of the advantages of case-hardening and tempering the steel.

The conduit may be provided with an end fitting, shown as having a sleeve 50 with a recess adapted to receive the end of the conduit, and which may have a tubular attaching portion 52 spun over at its end to hold sleeved thereon an attaching nut 54.

In Figures 9 and 10, the fitting has internal threads 56 which are threaded over the convolutions at the end of the conduit; in Figure 9 a helical coil 58 of copper or other metal wire is threaded onto the convolutions inside the threads 56.

A copper or other metal washer 60 may be seated in the bottom of the recess in the fitting, and abutted by the end of the conduit, in any of the modifications where it is desired.

In Figures 11–14, the interior of the recess in the fitting is smooth, and is sleeved over the end of the conduit. In Figure 11, a helical coil 62 of bonding metal wire, oval or circular in cross-section, is threaded over the convolutions of the conduit within the fitting. In Figure 12 there is shown such a coil 64, but of special cross-section (generally U-shaped) such that it substantially fills the space between adjacent convolutions. In Figure 13, the recess in the fitting is provided with an internal bushing or plating 66 of copper or other bonding metal. In Figure 14, the corrugations 20 of the conduit are flattened down to give surface contact with the wall of the recess of the fitting.

In all of the above cases, after the conduits and their respective fitting or fittings are passed through the heating and cooling operations in the hydrogen furnace, the fittings are permanently attached to the ends of the conduits by joints which are virtually continuous with the joints between the overlapping margins 24, so that there is no possibility of gaps or leaks where the jointed margins 24 pass into the fitting.

The joint which attaches the fitting is of very large area, especially in the arrangement of Figure 9, and almost equally so in Figures 10, 11, 12, and 14, in which it includes substantially the greater part of the peripheral area of the conduit inside the recess in the fitting, and also (especially in Figures 9, 11, and 13) continues over the area where the end of the conduit abuts against the bottom of the recess. In Figure 13, the joint forms mainly along the tops of the corrugations 20, and at the end of the conduit, but for many purposes this is sufficient.

Figures 15, 16, and 17 show sections of three modifications after the final operation of compressing or collapsing the conduit axially (usually on a suitable mandrel or rod which prevents radial distortion).

In Figure 15, the jointed overlapping margins 24 are at the tops of the outwardly-extending inwardly-facing corrugations, and the integral corrugations 122 extend inwardly and face outwardly. The overlap of the portions 24 is approximately 120°, which has been determined empirically as correct to cause substantially uniform action of the corrugations when compressed to bring the opposite walls of the corrugations substantially together. For most purposes I prefer this form of conduit, as it is extremely flexible, and the double-thickness jointed portion 24 is on the outside where it takes most of the wear.

In Figure 16, the jointed overlapping portions 24 are at the bottoms of the outwardly-facing inwardly extending corrugations, and are continued for more than 120°. This makes them quite stiff, compared to the integral corrugation 220 at the center of the strip, and consequently most of the axial collapsing or compressing takes place in the latter, so that the inwardly-facing outwardly-extending corrugations are much narrower than the outwardly-facing jointed ones.

In the arrangement of Figure 17, the joint 24 is at the bottom of the outwardly-facing inwardly-extending corrugations, as in Figure 16, but is narrower, being about 120° the same as in Figure 15. This gives substantially equal axial compression, so that the outwardly-projecting integral corrugations 120 are substantially equal to the jointed corrugations 24.

While several illustrative embodiments have been described in detail, it is not my intention to limit the scope of the invention to those particular embodiments, or otherwise than by the terms of the appended claims. It is not my intention to claim in the present application any of the subject-matter claimed in my above-identified copending machine and method applications.

I claim:

1. A flexible conduit comprising a spirally-arranged corrugated metal strip having the margins of adjacent convolutions overlapping to a substantial extent and with the said margins permanently united by a metallic alloy bond throughout the surfaces of their overlapping portions to form a substantially integral wall portion of double thickness.

2. A corrugated conduit comprising a spirally-arranged corrugated strip having the margins of adjustment corrugations overlapping for a substantial area, and having a fitting mounted on its end, and having a continuous metallic alloy bond of metal permanently uniting the metal of said margins in such a manner that such margins form a substantially integral double-thickness portion, and said bond also integrally extending into the metal of said fitting and uniting the fitting to the end of the conduit.

CLAYTON C. HARRAH.